(12) United States Patent
Lambert

(10) Patent No.: US 8,039,140 B2
(45) Date of Patent: Oct. 18, 2011

(54) SEPARATOR FOR SECONDARY ELECTRICAL ACCUMULATORS WITH GAS RECOMBINATION

(75) Inventor: Urbain Lambert, Capellen (LU)

(73) Assignee: Amer-Sil S.A., Luxembourg (LU)

( * ) Notice: Subject to any disclaimer, the term of this patent is extended or adjusted under 35 U.S.C. 154(b) by 1029 days.

(21) Appl. No.: 10/508,643

(22) PCT Filed: Mar. 19, 2003

(86) PCT No.: PCT/EP03/50072
§ 371 (c)(1),
(2), (4) Date: Sep. 17, 2004

(87) PCT Pub. No.: WO03/079465
PCT Pub. Date: Sep. 25, 2003

(65) Prior Publication Data
US 2005/0158630 A1    Jul. 21, 2005

(30) Foreign Application Priority Data

Mar. 20, 2002  (LU) .......................................... 90901

(51) Int. Cl.
*H01M 2/16* (2006.01)
(52) U.S. Cl. ......... 429/129; 429/145; 429/247; 429/252
(58) Field of Classification Search .................. None
See application file for complete search history.

(56) References Cited

U.S. PATENT DOCUMENTS

| | | |
|---|---|---|
| 3,351,495 A | 11/1967 | Larsen et al. |
| 3,696,061 A * | 10/1972 | Selsor et al. ..................... 521/64 |
| 4,153,760 A * | 5/1979 | Sundberg et al. ............. 429/252 |
| 4,335,193 A | 6/1982 | Doi et al. |
| 4,699,857 A * | 10/1987 | Giovannoni et al. ......... 429/204 |
| 5,389,463 A * | 2/1995 | Chang et al. ................... 429/142 |
| 2003/0022068 A1 * | 1/2003 | Pekala ........................... 429/248 |
| 2003/0054235 A1 * | 3/2003 | Zucker .......................... 429/145 |

FOREIGN PATENT DOCUMENTS

| | | |
|---|---|---|
| EP | 0 618 629 | 10/1994 |
| JP | 10-31991 | 2/1998 |
| JP | 10 031991 | 2/1998 |
| WO | WO 94/20995 | 9/1994 |
| WO | WO 98/47192 | 10/1998 |
| WO | WO 98/52240 | 11/1998 |
| WO | WO 99/67831 | 12/1999 |

OTHER PUBLICATIONS

Material Safety Data Sheet for Hi-Sil® 132 [online], Nov. 6, 2006 [retrieved Feb. 28, 2008]. Retrieved from the Internet<URL: http://www.harwickstandard.com/web/MSDS/0020301.pdf>.*
Clough et al. "Life and Capacity Improvements in Lead Acid Batteries Through Metal Control Additives." IEEE [online] 2001 [retrieved Feb. 26, 2008]. Retrieved from the Internet:<URL: http://ieeexplore.ieee.org/iel5/7257/19575/00905105.pdf?arnumber=905105>.*
International Preliminary Examination Report; PCT/EP2003/050072; Mar. 19, 2003.
Amer-Sil Separators-Gauntlets, "Amer-sil macroporous pvc/silica seperators";retrieved online Jan. 29, 2003; XP-002229331.
V. Toniazzo, "New separators for industrial and specialty lead acid batteries"; Journal of Power Sources; vol. 107, No. 2, Apr. 30, 2002, pp. 211-216, XP002229332.
International Search Report PCT/EP03/50072; Oct. 21, 2003.

* cited by examiner

*Primary Examiner* — Ula C Ruddock
*Assistant Examiner* — Alix Echelmeyer
(74) *Attorney, Agent, or Firm* — Cantor Colburn LLP

(57) ABSTRACT

An absorbent battery separator comprising a substantially homogeneous blend of a thermoplastic polymer and of at least one inert filler, where the inert filler is pyrogenic silica, precipitated silica, titanium dioxide, magnesium carbonate, magnesium oxide and magnesium hydroxide, or mixtures thereof and, the separator has a volume porosity of at least 75% and an extraction pore size of greater than 2 microns.

13 Claims, No Drawings

SEPARATOR FOR SECONDARY ELECTRICAL ACCUMULATORS WITH GAS RECOMBINATION

TECHNICAL FIELD OF INVENTION

The present invention relates to absorbent separators for secondary batteries and in particular for valve-regulated lead-acid batteries.

BRIEF DESCRIPTION OF RELATED ART

Lead-acid batteries are used for storing electrical energy in chemical form.

This type of battery can be charged and discharged many times—certain batteries can deliver several hundreds or even thousands of charge/discharge cycles before the amount of electrical energy delivered during the discharge is too low to meet the standards in force. Normally, this electrical performance threshold lies at 80% of the nominal capacity of the battery.

Maintenance of a conventional lead-acid battery consists in replacing the water that is lost by electrolysis, evaporation and corrosion of the positive grid.

To eliminate this maintenance, valve-regulated batteries have been developed, these also being known as gas-recombination batteries. Such a battery allows water loss to be considerably reduced, thanks to the recombination of oxygen that takes place in the battery toward the end of the recharge cycle.

The oxygen is formed by electrolysis of water on the positive plates toward the end of the recharge. This gas fills the battery and migrates toward the negative plates. The oxygen is reduced on the surface of these plates and is then recombined with hydrogen, present in the form of protons, to reform molecules of water.

The reduction of oxygen is possible because the battery is provided with a valve that prevents the oxygen from escaping from the battery and maintains a pressure inside the battery that is slightly above atmospheric pressure. This overpressure inside the battery also prevents the atmospheric gases from entering the battery.

Valve-regulated batteries are of two types, depending on the electrolyte immobilization system:

(i) if the electrolyte (sulfuric acid) is gelled by the addition of pyrogenic silica, the battery is called a "gel battery" and includes microporous flexible polymer separators in the form of sheets having ribs or corrugations. The separators are placed between plates of opposite polarity. In this case, oxygen transfer takes place via the microcracks that form in the gel and then via the pores of the separator;

(ii) if the liquid electrolyte is absorbed in the pores of a glass microfiber separator, the batteries are called "AGM batteries" (AGM standing for Absorptive Glass Material). These separators absorb and retain the liquid electrolyte in their pores, thanks to the capillary forces resulting from the entanglement of the glass microfibers. Thus, the separators retain the electrolyte near the plates independently of the position of the battery. The degree of saturation of the pores of the absorbent separator by the electrolyte must be less than 100% since it is necessary for there to be free spaces for the oxygen to be able to pass through the separator by going from the positive plates toward the negative plates.

In both these types of technology, the separators play a very important role in the recycling of the oxygen since they allow relatively effective transfer of oxygen from the positive plates to the negative plates thanks to a microporous internal structure relatively well adapted to this gas transport.

Conventionally, the separators for gel batteries are rigid microporous polymer sheets having ribs or corrugations. The two most common separators are those consisting of a polyester film covered with a phenolic resin (U.S. Pat. No. 3,622,393) and microporous separators consisting of a mixture of PVC and silica (U.S. Pat. No. 3,696,061). However, these separators, when undeformed or flat, have volume porosities that are between 67% and 72% and pore sizes substantially less than 2 µm in the case of a PVC separator. The product sold by Amer-Sil SA under the name DC HP 340 is one such example. In the case of the above PVC-based separators, the sole means of slightly increasing the volume and the size of the extraction pores is to carry out an additional step of "corrugating" a flat separator so as to obtain a corrugated separator.

These two conditions—total porosity and pore size—have proved to be nonoptimal for improving the transfer and recombination of oxygen and consequently the electrical performance of gas-recombination batteries.

The absorbent separators for AGM batteries conventionally consist of a nonwoven made of fibers having a certain capacity for retaining the electrolyte. These fibers are able to be rapidly and completely wetted by an aqueous acid electrolyte.

Various mixtures of fibers have been used in the past, such as mixtures of coarse glass fibers and fine glass fibers, with or without organic fibers. The fibers are used in such proportions that they retain a sufficient amount of electrolyte. Thus, U.S. Pat. No. 4,465,748 describes glass fiber separators comprising between 5 and 35% by weight of glass fibers having a diameter of less than 1 micron, the rest of the fibers having larger diameters, generally between 2 and 5 microns.

These fiber separators are easily crushed when they are being fitted into the battery. Once compressed, the fiber separators do not resume their initial thickness. They also undergo a not insignificant loss of thickness when the batteries are being filled, if they are saturated with sulfuric acid. In addition, during the charge/discharge cycles of AGM batteries, the alternating expansions and contractions of the positive and negative active substances exert various compressive forces on the glass fiber separator which degrade its mechanical properties and cause an irreversible reduction in thickness, which generally results in a partial loss of contact between the plates and the separator, the sole reservoir of acid. The immediate consequence is a reduction in ion exchange and a substantial and permanent loss of capacity of the battery.

BRIEF SUMMARY OF THE INVENTION

The invention proposes a microporous polymer separator for batteries that exhibits better properties as regards compression and having reasonable production costs. The invention therefore proposes a flat absorbent battery separator comprising a substantially homogeneous blend of a thermoplastic polymer and of at least one inert filler, characterized in that the inert filler is chosen from the group consisting of pyrogenic silica, precipitated silica, titanium dioxide, magnesium carbonate, magnesium oxide and magnesium hydroxide, or mixtures thereof, and in that the separator has a volume porosity of at least 75% and an extraction pore size of greater than 2 microns. The separator of the present invention contains less than 18% pyrogenic silica by volume.

Compared with existing separators, the novel separator allows very greatly reduced acid displacement and electrical resistance, and also optimized oxygen transfer. These two characteristics make it particularly effective in gelled-electrolyte gas-recombination batteries.

DETAILED DESCRIPTION OF THE INVENTION

According to one advantageous embodiment, for separators having no ribs, the volume porosity is greater than 78% and the extraction pore size in greater than 2.2 microns. Thus, for flat (uncorrugated) separators, pore volumes are obtained that are equivalent to, or even greater than, those obtained for conventional corrugated separators produced on the basis of U.S. Pat. No. 3,696,061.

The separator is extruded as a perfectly flat and absorbent sheet so as to be able to store and maintain the electrolyte in its pores, while still ensuring perfect contact between the plane surface of the separator and the plates of opposed polarity.

One of the advantages of such a separator for gas-recombination batteries is that it exhibits better compressive strength and greater toughness than conventional glass fiber separators. Moreover, the volume porosity (greater than 75%), the acid absorption capacity (between 0.9 g/cm$^3$ and 1.5 gm$^3$) and the bimodal pore size distribution (one family of pores between 0.01 and 0.50 microns and one family of pores between 2 and 10 microns) give the novel separator all the required properties for allowing proper fluid (electrolyte and oxygen) transfer management.

International patent application WO 99/67831 discloses a microporous separator for batteries based on a homogeneous blend of a polyolefin, an inert filler based on pyrogenic silica and, as appropriate, a plasticizer. The separator has an inert filler content of between 60 and 82% by volume relative to the bulk separator material, at least 20% by volume of which is pyrogenic silica.

However, compared with the polymeric separator disclosed in patent WO 99/67831, the present invention has two main advantages: (i) pores between 2 and 10 microns for optimized oxygen transfer (it should be noted that any risk of dendrites is remote, despite the relatively large size of this category of pores, given their tortuosity); and (ii) very reasonable production costs.

Another advantage of such an absorbent separator is that it has a higher tensile strength than that of conventional glass fiber separators.

From 0.5 to 5 parts, and preferably from 1 to 2 parts, of filler per part of thermoplastic resin may be used.

The polymer is preferably chosen from the group consisting of PVC, polyethylene, polypropylene and acrylic polymers.

The PVC sold under the name Norvinyl by Hydropolymers Nordic is particularly suitable for the application.

The separator preferably comprises between 30 and 70% of fine pores having a diameter of less than 1 μm and between 30 and 70% of extraction pores having a diameter of greater than 2 μm.

The diameter of the fine pores is preferably between 0.02 and 0.40, while the diameter of the coarse pores is between 2 and 10 μm.

One advantage of such a separator lies in the distribution between the fine pores and the coarser pores which are obtained during extraction of the solvents. This distribution between fine pores and coarser pores makes it possible to have an advantageous amount and level of electrolyte absorption. In addition, this pore size distribution makes it possible to obtain controlled circulation of the oxygen, whilst still minimizing or preventing the penetration of dendrites, thanks to their tortuosity.

The separators according to WO 99/67831 have few or no coarse pores.

In a preferred embodiment of the invention, the separator comprises between 0.1% and 5% by weight of water and between 0.01% and 0.5% by weight of cyclohexanone.

The separator may furthermore include additives such as lead sulfate or epoxydized soybean oil and/or plasticizers, such as for example dioctyl phthalate.

It is possible to add, for example, between 0.1% and 5% by weight relative to the carbon black filler as coloring agent.

To improve the longevity of the battery, it is advantageous to incorporate a metal capturing agent in the separator. One particularly advantageous metal ion capturing agent is sold under the name ES-A4 by Ensci Inc of Pismo Beach, Calif. 93448, USA.

In another advantageous embodiment and with a view to use in gel batteries, the separator has ridges or ribs on at least one face. These ribs generally have a height of between 2 and 6 mm, and the distance between two adjacent ridges is preferably between 1 and 15 mm. The thickness at the base of the ridges normally lies within the 0.3 to 1.0 mm range. Bearing in mind the fact that the thickness of flat separators lies between about 0.2 and about 1.0 mm, the ridges on at least one of the faces of the separator make it possible for them to be used in batteries of the gelled acid type that require larger thicknesses. The presence of ribs on one or both faces reduces the porosity of the separator a little.

Alternatively, the flat separator may be deformed or "corrugated" by goffering or by another process suitable for obtaining a separator in the form of a sheet having corrugations. This corrugation operation has the beneficial effect of further increasing the volume porosity of the initial flat separator. For example, a flat separator of 79.4% volume porosity will have an 81.5% volume porosity after having been corrugated in order to achieve a final thickness of 1.60 mm.

The separator, whether corrugated or extruded with ribs, constitutes a particularly effective separator in gelled-electrolyte gas-recombination batteries. This is because, compared with existing separators, the novel separator allows very greatly reduced acid displacement and electrical resistance, and also optimized oxygen transfer.

For application in AGM (Absorbtive Glass Mat)-type batteries, it is necessary to use flat separators. A flat sheet obtained using the process described in the present invention may be used as such. Compared with a flat separator of 0.65 mm in thickness manufactured using the process described in U.S. Pat. No. 3,696,061, the pore size of which is less than 2 microns and the volume porosity is around 67% to 70%, a flat separator 0.65 mm in thickness prepared using the present invention will have a volume porosity of 79.4% for example, with 50% of extraction pores having a size between 2 microns and 10 microns.

According to another aspect, the present invention also proposes a process for manufacturing an absorbent battery separator, comprising the following steps:
  a) formation of a powder blend comprising a thermoplastic resin and at least one dry mineral filler having pores;
  b) addition of a first solvent so that the first solvent is absorbed in the pores of the mineral filler;
  c) addition of a second liquid so as to displace, at least partially, the first solvent from the pores of the mineral filler in order to form a freely flowing wet powder;
  d) formation of a raw separator by extrusion and calendering;

e) liquid phase extraction of the primary solvent from the raw separator in order to form an absorbent separator; and f) possible deformation in order to form a corrugated separator for use in gel batteries.

Depending on the envisioned use, the calender rolls will be chosen so as to make:

either a ribbed separator for use in gel batteries;

or a flat separator constituting the base of the corrugated separator for gel batteries;

or a flat separator used as such in AGM batteries.

It should be emphasized that, during blending (steps a) to c)), melting the blend or forming a paste is avoided.

The powder blend thus formed is stable and may be either stored (preferably in hermetically sealed containers in order to avoid solvent evaporation) or be converted directly into a separator. This conversion may take place by extrusion and calendering, or by another appropriate process.

The first solvent, at least partially displaced from the filler, helps to plasticize the blend so that the raw separator can be formed.

Once the raw separator has been formed, the solvents are extracted therefrom by passing it through a liquid bath. The extraction pores are created during this step. After extraction of the solvent(s), the separator is dried and the pores of the filler are liberated.

The choice and the amount of solvent depend on the resin employed. For example, in the case of vinyl chloride polymers, it is preferred to use ketones as first solvent. When polystyrene is used, the first solvent may be an aromatic hydrocarbon, such as benzene or xylene, or a chlorinated hydrocarbon, such as methyl chloroform, or an ester, such as ethyl acetate. Polyolefins, such as polyethylene or polypropylene or copolymers thereof, may be dissolved or solvated by solvents such as ethylene dichloride, trichloroethylene or methyl tetrachloride ($CCl_4$).

Since the solvent must be extracted from the raw separator and at the same time evaporative loss must be minimized, it is desirable for this solvent to be relatively nonvolatile. It is preferable for it to have a boiling point of at least 120° C. and for it to be able to be extracted relatively easily with water or another relatively inexpensive and relatively volatile secondary solvent, which in addition causes little or no solvation of the resin or porous filler employed.

The first solvent may be chosen from the group consisting of cyclohexanone, methyl ethyl ketone, tetrahydrofuran, phorone (diisopropylidene acetone), methyl acetate and mixtures thereof, and the second solvent is generally water.

The first solvent is added in a proportion that is less than the saturation level of the polymer/filler blend. This proportion of first solvent that may be added to the blend depends on several factors, especially on the polymer, on the filler, on its amount and its absorptivity. It also depends on factors that are associated with the type of blender used and with the speed and temperature during the blending. The total amount of the first solvent is chosen so that it is substantially entirely absorbed by the filler under the chosen operating conditions.

If the proportion of the first solvent is too high, local paste formation occurs due to the polymer being dissolved locally by the first solvent.

To optimize the incorporation of the first solvent, it is preferred to add it in the form of a mist over a period of 40 minutes or longer.

After incorporation of the first solvent, a rest time of 20 minutes is needed before a second solvent is added. Next, only the second liquid, in general water, is added to the blend. The second liquid is preferably also added in the form of a mist. The second solvent is also absorbed by the filler.

After the raw separator has been formed, it must be transferred into the extraction medium under conditions such that the amount of the first and second solvent that evaporates before its immersion in the extraction medium is minimized.

During the extraction step, the extraction medium is maintained at a temperature close to, or preferably above, the temperature used in the preceding steps.

For example, if during the formation step the temperature of the blend is below about 70° C. and if the raw separator is formed at about this temperature, the extraction liquid is advantageously maintained at a temperature of about 5 to 20° C. above the formation temperature, but substantially below the boiling point of the extraction liquid and of the solvents employed. In general, the extraction bath is maintained at a temperature between 72.5° C. and 75.5° C. Surprisingly, it has been found that the temperature of the extraction bath close to the calender is important for achieving the desired porosity. This is because the temperature of the bath at the point where the sheet is introduced must be precisely controlled and measures have to be taken to minimize any temperature deviations. Too high or too low a temperature or excessively large temperature variations have a negative effect on the porosity of the separator.

By maintaining the extraction bath at this high temperature, any tensile stresses that may have been created beforehand in the extruded or calendered sheet are relaxed and the primary solvent is replaced therein by the secondary solvent without introducing any new tensile stress, thus reducing shrinkage to a minimum, while achieving a maximum final porosity.

In the present invention, the shrinkage is reduced to a minimum and the desired microporosity is obtained. This porosity is obtained when the primary solvent, which is extracted from the plastic sheet, is replaced in the sheet by the extraction liquid. For example, although in one typical embodiment the organic solvent may constitute 20 to 30% by volume of the paste, during its removal by extraction from the raw separator, the total volume of the separator will undergo a relatively small shrinkage, usually about 10% or less. Thus, unlike the case of solvent removal by evaporation, removal of the primary solvent by extraction leaves no free volume for the deplasticized resinous mass to shrink.

It should be noted that the temperature conditions during extraction must be closely controlled in order to obtain reproducible extraction pore formation. The temperature and other parameter conditions of the extraction bath have a major effect on the size, number and distribution of the extraction pores.

The organic solvent content of the extraction bath is preferably maintained as low as possible. The concentration of the solvent in the bath may be reduced by continuous distillation of the solvent.

As the extraction of the organic solvent from the raw separator proceeds, the primary solvent is replaced with water and the separator becomes deplasticized and stiffens. The separator is then dried.

The examples given above show that the novel separators (with the brand name Amersorb) have a markedly higher porosity than that of the separators currently on the market. Because of the higher porosity, the electrical resistance and the acid displacement are substantially less.

The methods employed for determining the characteristics of the separators are:

1. Backweb thickness: BCI TM 3.203 or alternatively Amer-sil PT-CQ-P07;

2. Method of determining the volume porosity and moisture content of a battery separator: BCI TM 3.207 or alternatively Amer-sil PT-CQ-P08 (PT CQ-P21);
3. Pore size characteristics of microporous separators: BCI TM3.208 or alternatively Amer-sil PT-CQ-P03;
4. Method for determining the electrical resistance of battery separators: BCI TM3.218 or alternatively Amer-sil PT-CQ-P09;
5. Acid displacement of separators: Amer-sil PT-CQ-P15; and
6. Measurement of the weight per unit area of separators: Amer-sil PT-CQ-P10.

EXAMPLE 1

Ribbed Separators (Typical Values)

|  | Former DC340 | Amersorb DC340 |
| --- | --- | --- |
| Thickness (mm) | 3.40 | 3.40 |
| Backweb (mm) | 0.60 | 0.60 |
| Volume porosity (%) | 68.0 | 75.8 |
| Fine pore size (μm) | 0.04 | 0.04 |
| Extraction pore size (μm) | 1.5 | 2.8 |
| Electrical resistance (mΩ · cm$^2$) | 225 | 120 |
| Acid displacement (ml/m$^2$) | 320 | 273 |

EXAMPLE 2

Flat Separators (Typical Values)

|  | Former FF060 | Amersorb FF060 | Former CF075 | Amersorb CF075 |
| --- | --- | --- | --- | --- |
| Thickness (mm) | 0.60 | 0.60 | 0.75 | 0.75 |
| Grammage (g/m$^2$) | 278 | 260 | 370 | 298 |
| Volume porosity (%) | 69.0 | 79.4 | 67.9 | 78.1 |
| Fine pore size (μm) | 0.05 | 0.05 | 0.05 | 0.05 |
| Extraction pore size (μm) | 1.5 | 6.5 | 1.3 | 7.2 |
| Electrical resistance (mΩ · cm$^2$) | 118 | 55 | 178 | 75 |
| Acid displacement (ml/m$^2$) | 165 | 150 | 223 | 168 |

EXAMPLE 3

Corrugated Separators (Typical Values)

|  | Former SK160 | Amersorb SK160 |
| --- | --- | --- |
| Thickness (mm) | 1.60 | 1.60 |
| Grammage (g/m$^2$) | 304 | 237 |
| Volume porosity (%) | 73.9 | 81.5 |
| Fine pore size (μm) | 0.05 | 0.05 |
| Extraction pore size (μm) | 3.2 | 9.5 |
| Electrical resistance (mΩ · cm$^2$) | 75 | 50 |
| Acid displacement (ml/m$^2$) | 182 | 134 |

The invention claimed is:

1. An absorbent battery separator comprising a substantially homogeneous blend of a thermoplastic polymer and of at least one inert filler, the inert filler being chosen from the group consisting of pyrogenic silica, precipitated silica, titanium dioxide, magnesium carbonate, magnesium oxide, magnesium hydroxide, and mixtures thereof, the separator having a volume porosity of at least 75% and a bimodal pore size distribution comprising between 30 and 70% of fine pores having a diameter of less than 1 μm and between 30 and 70% of extraction pores having a diameter of greater than 2 μm, wherein the separator contains less than 18% pyrogenic silica by volume, wherein the fine pores and the extraction pores include a geometry defined by solvent particles from two solvents that are absorbed by and then removed from the separator.

2. The separator as claimed in claim 1, wherein the inert filler represents between 0.7 and 2.5 times the weight of the thermoplastic polymer.

3. The separator as claimed in claim 1, wherein the polymer is chosen from the group consisting of PVC, polyethylene, polypropylene and acrylic polymers.

4. The separator as claimed in claim 1, wherein the polymer is PVC.

5. The separator as claimed in claim 1, further comprising between 0.1% and 5% by weight of water and between 0.01% and 0.5% by weight of cyclohexanone.

6. The separator as claimed in claim 1, further comprising up to 30% by weight of a plasticizer.

7. The separator as claimed in claim 1, further comprising between 1% and 8% by weight of a metal ion capturing agent.

8. The separator as claimed in claim 1, further comprising ribs.

9. The separator as claimed in claim 7, wherein the separator is in the form of a sheet having corrugations.

10. The separator as claimed in claim 1, wherein the extraction pores are tortuous.

11. A process for manufacturing an absorbent battery separator, comprising:
    forming a powder blend comprising a thermoplastic resin and at least one dry mineral filler having pores;
    adding a first solvent so that the first solvent is absorbed in the pores of the mineral filler, said first solvent being added via a mist;
    adding a second solvent so as to displace the first solvent from the pores of the mineral filler said second solvent being added via a mist;
    forming of a raw separator by extrusion and calendering;
    extracting the solvents via liquid phase and forming extraction pores having a diameter of greater than 2 μm in an absorbent separator via said extracting;
    forming the absorbent separator to also include fine pores having a diameter of less than 1 μm; and
    wherein a temperature of the extraction liquid is maintained close to a temperature of the raw separator during a time intervening the formation of the raw separator and the liquid phase extraction.

12. The process as claimed in claim 11, wherein the first solvent is chosen from the group consisting of cyclohexanone, methyl ethyl ketone, tetrahydrofuran, methyl acetate and mixtures thereof, and the second solvent is water.

13. The process as claimed in claim 11, wherein the temperature of the liquid phase extraction is maintained about 5° C. to 20° C. above the temperature in the formation of the raw separator.

* * * * *